(12) United States Patent  
Arakawa et al.

(10) Patent No.: US 8,364,869 B2  
(45) Date of Patent: Jan. 29, 2013

(54) METHODS AND APPARATUS FOR MANAGING VIRTUAL PORTS AND LOGICAL UNITS ON STORAGE SYSTEMS

(75) Inventors: Hiroshi Arakawa, Sunnyvale, CA (US); Toshio Otani, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/590,521

(22) Filed: Aug. 21, 2012

(65) Prior Publication Data

US 2012/0317311 A1    Dec. 13, 2012

Related U.S. Application Data

(63) Continuation of application No. 12/569,453, filed on Sep. 29, 2009, now Pat. No. 8,260,986.

(51) Int. Cl.  
*G06F 3/00* (2006.01)  
*G06F 13/00* (2006.01)

(52) U.S. Cl. .................. 710/62; 710/5; 710/8; 710/15; 710/32

(58) Field of Classification Search .................. None  
See application file for complete search history.

(56) References Cited

U.S. PATENT DOCUMENTS

2008/0037544 A1    2/2008  Yano et al.  
2009/0025007 A1    1/2009  Hara et al.

*Primary Examiner* — Scott Sun  
(74) *Attorney, Agent, or Firm* — Hitachi America, Ltd.

(57) ABSTRACT

A storage system configured to associate a virtual port 810 to a plurality of physical ports 800. In response to commands from computers, the storage system 100 manages relation between physical ports and virtual ports and relation between virtual port and volumes by performing processes such as creating a virtual port, assigning LUs to a virtual port, moving a virtual port between physical ports and deleting a virtual port. The storage system also maintains/calculates statistics information for ports and displays the information for each virtual port.

18 Claims, 18 Drawing Sheets

| Physical Port ID | (Physical) WWPN |
|---|---|
| 0 | 01:23:45:67:89:AB:CD:E0 |
| 1 | 01:23:45:67:89:AB:CD:E1 |
| 2 | 01:23:45:67:89:AB:CD:E2 |
| 3 | 01:23:45:67:89:AB:CD:E3 |
| : | |

| Volume ID | Size | Disk ID | Start Address | Access Prohibition | Assigned | Physical Port / Virtual Port | Port ID | LUN |
|---|---|---|---|---|---|---|---|---|
| 0 | 100 GB | 17 | 0 | No | Yes | Virtual Port | 0 | 1 |
| 1 | 200 GB | 23 | 209715200 | No | Yes | Virtual Port | 3 | 2 |
| 2 | 150 GB | 11 | 0 | No | Yes | Virtual Port | 2 | 0 |
| 3 | 100 GB | 86 | 0 | No | Yes | Physical Port | 20 | 7 |
| 4 | 300 GB | 35 | 0 | Yes | No | - | - | - |
| : | | | | | | | | |

| Physical Port ID | Virtual Port ID | (Virtual) WWPN | Number of LU | LUN |
|---|---|---|---|---|
| 0 | 0 | 01:23:45:67:89:AB:CD:F0 | 2 | 0, 1 |
|   | 1 | 01:23:45:67:89:AB:CD:F1 | 2 | 3, 4 |
|   | 2 | 01:23:45:67:89:AB:CD:F2 | 4 | 0, 1, 2, 3 |
|   | 3 | 01:23:45:67:89:AB:CD:F3 | 1 | 2 |
| 1 | 0 | 01:23:45:67:89:AB:CD:F0 | 3 | 2, 3, 4 |
|   | 1 | 01:23:45:67:89:AB:CD:F1 | 2 | 0, 1 |
|   | 2 | 01:23:45:67:89:AB:CD:F2 | 2 | 4, 6 |
| 2 | 4 | 01:23:45:67:89:AB:CD:F4 | 3 | 1, 3, 4 |
| : |   |   |   |   |
| None | 5 | 01:23:45:67:89:AB:CD:F5 | 2 | 2, 3 |
|   | 6 | 01:23:45:67:89:AB:CD:F6 | 3 | 0, 1, 2 |

| Virtual Port ID | (Virtual) WWPN | Number of Physical Ports | Physical Port ID | Number of LU | LUN |
|---|---|---|---|---|---|
| 0 | 01:23:45:67:89:AB:CD:F0 | 2 | 0 | 2 | 0, 1 |
| | | | 1 | 3 | 2, 3, 4 |
| 1 | 01:23:45:67:89:AB:CD:F1 | 2 | 0 | 2 | 3, 4 |
| | | | 1 | 2 | 0, 1 |
| 2 | 01:23:45:67:89:AB:CD:F2 | 2 | 0 | 4 | 0, 1, 2, 3 |
| | | | 1 | 2 | 4, 6 |
| 3 | 01:23:45:67:89:AB:CD:F3 | 1 | 0 | 1 | 2 |
| 4 | 01:23:45:67:89:AB:CD:F4 | 1 | 2 | 3 | 1, 3, 4 |
| 5 | 01:23:45:67:89:AB:CD:F5 | 0 | None | 2 | 2, 3 |
| 6 | 01:23:45:67:89:AB:CD:F6 | 0 | None | 3 | 0, 1, 2 |
| : | | | | | |

202(a)

| Physical Port ID | Virtual Port ID | (Virtual) WWPN | Number of LU | LUN |
|---|---|---|---|---|
| 0 | 0 | 01:23:45:67:89:AB:CD:F0 | 2 | 0, 1 |
| | 1 | 01:23:45:67:89:AB:CD:F1 | 2 | 3, 4 |
| | 2 | 01:23:45:67:89:AB:CD:F2 | 4 | 0, 1, 2, 3 |
| 1 | 0 | 01:23:45:67:89:AB:CD:F0 | 3 | 2, 3, 4 |
| | 1 | 01:23:45:67:89:AB:CD:F1 | 2 | 0, 1 |
| | 2 | 01:23:45:67:89:AB:CD:F2 | 2 | 4, 6 |
| | 3 | 01:23:45:67:89:AB:CD:F3 | 1 | 2 |
| 2 | 4 | 01:23:45:67:89:AB:CD:F4 | 3 | 1, 3, 4 |
| ⋮ | | | | |
| None | 5 | 01:23:45:67:89:AB:CD:F5 | 2 | 2, 3 |
| | 6 | 01:23:45:67:89:AB:CD:F6 | 3 | 0, 1, 2 |

| Virtual Port ID | (Virtual) WWPN | Number of Physical Ports | Physical Port ID | Number of LU | LUN |
|---|---|---|---|---|---|
| 0 | 01:23:45:67:89:AB:CD:F0 | 2 | 0 | 2 | 0, 1 |
| | | | 1 | 3 | 2, 3, 4 |
| 1 | 01:23:45:67:89:AB:CD:F1 | 2 | 0 | 2 | 3, 4 |
| | | | 1 | 2 | 0, 1 |
| 2 | 01:23:45:67:89:AB:CD:F2 | 2 | 0 | 4 | 0, 1, 2, 3 |
| | | | 1 | 2 | 4, 6 |
| 3 | 01:23:45:67:89:AB:CD:F3 | 1 | 1 | 1 | 2 |
| 4 | 01:23:45:67:89:AB:CD:F4 | 1 | 2 | 3 | 1, 3, 4 |
| 5 | 01:23:45:67:89:AB:CD:F5 | 0 | None | 2 | 2, 3 |
| 6 | 01:23:45:67:89:AB:CD:F6 | 0 | None | 3 | 0, 1, 2 |
| ⋮ | | | | | |

Fig. 12

| Physical Port ID | Virtual Port ID | (Virtual) WWPN | Number of LU | LUN |
|---|---|---|---|---|
| 0 | 1 | 01:23:45:67:89:AB:CD:F1 | 2 | 3, 4 |
| 0 | 2 | 01:23:45:67:89:AB:CD:F2 | 4 | 0, 1, 2, 3 |
| 0 | 3 | 01:23:45:67:89:AB:CD:F3 | 1 | 2 |
| 1 | 0 | 01:23:45:67:89:AB:CD:F0 | 5 | 0, 1, 2, 3, 4 |
| 1 | 1 | 01:23:45:67:89:AB:CD:F1 | 2 | 0, 1 |
| 1 | 2 | 01:23:45:67:89:AB:CD:F2 | 2 | 4, 6 |
| 2 | 4 | 01:23:45:67:89:AB:CD:F4 | 3 | 1, 3, 4 |
| ⋮ | | | | |
| None | 5 | 01:23:45:67:89:AB:CD:F5 | 2 | 2, 3 |
| None | 6 | 01:23:45:67:89:AB:CD:F6 | 3 | 0, 1, 2 |

Fig. 13

| Virtual Port ID | (Virtual) WWPN | Number of Physical Ports | Physical Port ID | Number of LU | LUN |
|---|---|---|---|---|---|
| 0 | 01:23:45:67:89:AB:CD:F0 | 2 | 1 | 5 | 0, 1, 2, 3, 4 |
| 1 | 01:23:45:67:89:AB:CD:F1 | 2 | 0 | 2 | 3, 4 |
| 1 | 01:23:45:67:89:AB:CD:F1 | 2 | 1 | 2 | 0, 1 |
| 2 | 01:23:45:67:89:AB:CD:F2 | 2 | 0 | 4 | 0, 1, 2, 3 |
| 2 | 01:23:45:67:89:AB:CD:F2 | 2 | 1 | 2 | 4, 6 |
| 3 | 01:23:45:67:89:AB:CD:F3 | 1 | 0 | 1 | 2 |
| 4 | 01:23:45:67:89:AB:CD:F4 | 1 | 2 | 3 | 1, 3, 4 |
| 5 | 01:23:45:67:89:AB:CD:F5 | 0 | None | 2 | 2, 3 |
| 6 | 01:23:45:67:89:AB:CD:F6 | 0 | None | 3 | 0, 1, 2 |
| ⋮ | | | | | |

| Physical Port ID | Virtual Port ID | (Virtual) WWPN | Number of LU | LUN |
|---|---|---|---|---|
| 0 | 0 | 01:23:45:67:89:AB:CD:F0 | 2 | 0, 1 |
| | 1 | 01:23:45:67:89:AB:CD:F1 | 2 | 3, 4 |
| | 2 | 01:23:45:67:89:AB:CD:F2 | 2 | 0, 1 |
| | 3 | 01:23:45:67:89:AB:CD:F3 | 1 | 2 |
| 1 | 0 | 01:23:45:67:89:AB:CD:F0 | 3 | 2, 3, 4 |
| | 1 | 01:23:45:67:89:AB:CD:F1 | 2 | 0, 1 |
| | 2 | 01:23:45:67:89:AB:CD:F2 | 2 | 4, 6 |
| 2 | 2 | 01:23:45:67:89:AB:CD:F2 | 2 | 2, 3 |
| | 4 | 01:23:45:67:89:AB:CD:F4 | 3 | 1, 3, 4 |
| ⋮ | | | | |
| None | 5 | 01:23:45:67:89:AB:CD:F5 | 2 | 2, 3 |
| | 6 | 01:23:45:67:89:AB:CD:F6 | 3 | 0, 1, 2 |

| Virtual Port ID | (Virtual) WWPN | Number of Physical Ports | Physical Port ID | Number of LU | LUN |
|---|---|---|---|---|---|
| 0 | 01:23:45:67:89:AB:CD:F0 | 2 | 0 | 2 | 0, 1 |
| | | | 1 | 3 | 2, 3, 4 |
| 1 | 01:23:45:67:89:AB:CD:F1 | 2 | 0 | 2 | 3, 4 |
| | | | 1 | 2 | 0, 1 |
| 2 | 01:23:45:67:89:AB:CD:F2 | 3 | 0 | 2 | 0, 1 |
| | | | 1 | 2 | 4, 6 |
| | | | 2 | 2 | 2, 3 |
| 3 | 01:23:45:67:89:AB:CD:F3 | 1 | 0 | 1 | 2 |
| 4 | 01:23:45:67:89:AB:CD:F4 | 1 | 2 | 3 | 1, 3, 4 |
| 5 | 01:23:45:67:89:AB:CD:F5 | 0 | None | 2 | 2, 3 |
| 6 | 01:23:45:67:89:AB:CD:F6 | 0 | None | 3 | 0, 1, 2 |
| ⋮ | | | | | |

Fig. 16

| Volume ID | Size | Disk ID | Start Address | Access Prohibition | Assigned | Physical Port / Virtual Port | Port ID | LUN |
|---|---|---|---|---|---|---|---|---|
| 0 | 100 GB | 17 | 0 | Yes | No | - | - | - |
| 1 | 200 GB | 23 | 209715200 | No | Yes | Virtual Port | 3 | 2 |
| 2 | 150 GB | 11 | 0 | No | Yes | Virtual Port | 2 | 0 |
| 3 | 100 GB | 86 | 0 | No | Yes | Physical Port | 20 | 7 |
| 4 | 300 GB | 35 | 0 | Yes | No | - | - | - |
| : | | | | | | | | |

202(a)

| Physical Port ID | Virtual Port ID | (Virtual) WWPN | Number of LU | LUN |
|---|---|---|---|---|
| 0 | 1 | 01:23:45:67:89:AB:CD:F1 | 2 | 3, 4 |
| | 2 | 01:23:45:67:89:AB:CD:F2 | 4 | 0, 1, 2, 3 |
| | 3 | 01:23:45:67:89:AB:CD:F3 | 1 | 2 |
| 1 | 0 | 01:23:45:67:89:AB:CD:F0 | 3 | 2, 3, 4 |
| | 1 | 01:23:45:67:89:AB:CD:F1 | 2 | 0, 1 |
| | 2 | 01:23:45:67:89:AB:CD:F2 | 2 | 4, 6 |
| 2 | 4 | 01:23:45:67:89:AB:CD:F4 | 3 | 1, 3, 4 |
| ⋮ | | | | |
| None | 5 | 01:23:45:67:89:AB:CD:F5 | 2 | 2, 3 |
| | 6 | 01:23:45:67:89:AB:CD:F6 | 3 | 0, 1, 2 |

| Virtual Port ID | (Virtual) WWPN | Number of Physical Ports | Physical Port ID | Number of LU | LUN |
|---|---|---|---|---|---|
| 0 | 01:23:45:67:89:AB:CD:F0 | 2 | 1 | 3 | 2, 3, 4 |
| 1 | 01:23:45:67:89:AB:CD:F1 | 2 | 0 | 2 | 3, 4 |
| | | | 1 | 2 | 0, 1 |
| 2 | 01:23:45:67:89:AB:CD:F2 | 2 | 0 | 4 | 0, 1, 2, 3 |
| | | | 1 | 2 | 4, 6 |
| 3 | 01:23:45:67:89:AB:CD:F3 | 1 | 0 | 1 | 2 |
| 4 | 01:23:45:67:89:AB:CD:F4 | 1 | 2 | 3 | 1, 3, 4 |
| 5 | 01:23:45:67:89:AB:CD:F5 | 0 | None | 2 | 2, 3 |
| 6 | 01:23:45:67:89:AB:CD:F6 | 0 | None | 3 | 0, 1, 2 |
| ⋮ | | | | | |

| Physical Port ID | Virtual Port ID | (Virtual) WWPN | Number of LU | LUN |
|---|---|---|---|---|
| 0 | 1 | 01:23:45:67:89:AB:CD:F1 | 2 | 3, 4 |
|   | 2 | 01:23:45:67:89:AB:CD:F2 | 4 | 0, 1, 2, 3 |
|   | 3 | 01:23:45:67:89:AB:CD:F3 | 1 | 2 |
| 1 | 1 | 01:23:45:67:89:AB:CD:F1 | 2 | 0, 1 |
|   | 2 | 01:23:45:67:89:AB:CD:F2 | 2 | 4, 6 |
| 2 | 4 | 01:23:45:67:89:AB:CD:F4 | 3 | 1, 3, 4 |
| ⋮ |   |   |   |   |
| None | 5 | 01:23:45:67:89:AB:CD:F5 | 2 | 2, 3 |
|   | 6 | 01:23:45:67:89:AB:CD:F6 | 3 | 0, 1, 2 |

| Virtual Port ID | (Virtual) WWPN | Number of Physical Ports | Physical Port ID | Number of LU | LUN |
|---|---|---|---|---|---|
| 1 | 01:23:45:67:89:AB:CD:F1 | 2 | 0 | 2 | 3, 4 |
|   |   |   | 1 | 2 | 0, 1 |
| 2 | 01:23:45:67:89:AB:CD:F2 | 2 | 0 | 4 | 0, 1, 2, 3 |
|   |   |   | 1 | 2 | 4, 6 |
| 3 | 01:23:45:67:89:AB:CD:F3 | 1 | 0 | 1 | 2 |
| 4 | 01:23:45:67:89:AB:CD:F4 | 1 | 2 | 3 | 1, 3, 4 |
| 5 | 01:23:45:67:89:AB:CD:F5 | 0 | None | 2 | 2, 3 |
| 6 | 01:23:45:67:89:AB:CD:F6 | 0 | None | 3 | 0, 1, 2 |
| ⋮ |   |   |   |   |   |

Fig. 22

| Physical Port ID | Virtual Port ID | Items | Term | | | |
|---|---|---|---|---|---|---|
| | | | 2009/5/2 6:45 | 2009/5/2 6:50 | 2009/5/2 6:55 | ... |
| 0 | 0 | Bytes Received /sec | | | | |
| | | Byte Sent /sec | | | | |
| | | Packets Received /sec | | | | |
| | | : | | | | |
| | 1 | Bytes Received /sec | | | | |
| | | Byte Sent /sec | | | | |
| | | Packets Received /sec | | | | |
| | | : | | | | |
| | 2 | Bytes Received /sec | | | | |
| | | Byte Sent /sec | | | | |
| | | Packets Received /sec | | | | |
| | | : | | | | |
| | 3 | Bytes Received /sec | | | | |
| | | Byte Sent /sec | | | | |
| | | Packets Received /sec | | | | |
| | | : | | | | |
| 1 | 0 | Bytes Received /sec | | | | |
| | | Byte Sent /sec | | | | |
| | | Packets Received /sec | | | | |
| | | : | | | | |
| | 1 | Bytes Received /sec | | | | |
| | | Byte Sent /sec | | | | |
| | | Packets Received /sec | | | | |
| | | : | | | | |
| | 2 | Bytes Received /sec | | | | |
| | | Byte Sent /sec | | | | |
| | | Packets Received /sec | | | | |
| | | : | | | | |
| : | : | : | | | | |

Fig. 23

| Virtual Port ID | Items | Term | | | |
|---|---|---|---|---|---|
| | | 2009/5/2 6:45 | 2009/5/2 6:50 | 2009/5/2 6:55 | ... |
| 0 | Bytes Received /sec | | | | |
| | Byte Sent /sec | | | | |
| | Packets Received /sec | | | | |
| | : | | | | |
| 1 | Bytes Received /sec | | | | |
| | Byte Sent /sec | | | | |
| | Packets Received /sec | | | | |
| | : | | | | |
| 2 | Bytes Received /sec | | | | |
| | Byte Sent /sec | | | | |
| | Packets Received /sec | | | | |
| | : | | | | |
| 3 | Bytes Received /sec | | | | |
| | Byte Sent /sec | | | | |
| | Packets Received /sec | | | | |
| | : | | | | |
| : | : | | | | |

| Storage System ID | Physical Port ID | Virtual Port ID | Items | Term | | | |
|---|---|---|---|---|---|---|---|
| | | | | 2009/5/2 6:45 | 2009/5/2 6:50 | 2009/5/2 6:55 | ... |
| 0 | 0 | 0 | Bytes Received /sec | | | | |
| | | | Byte Sent /sec | | | | |
| | | | Packets Received /sec | | | | |
| | | | : | | | | |
| | | 1 | Bytes Received /sec | | | | |
| | | | Byte Sent /sec | | | | |
| | | | Packets Received /sec | | | | |
| | | | : | | | | |
| | | 2 | Bytes Received /sec | | | | |
| | | | Byte Sent /sec | | | | |
| | | | Packets Received /sec | | | | |
| | | | : | | | | |
| | | 3 | Bytes Received /sec | | | | |
| | | | Byte Sent /sec | | | | |
| | | | Packets Received /sec | | | | |
| | | | : | | | | |
| | 1 | 0 | Bytes Received /sec | | | | |
| | | | Byte Sent /sec | | | | |
| | | | Packets Received /sec | | | | |
| | | | : | | | | |
| | | 1 | Bytes Received /sec | | | | |
| | | | Byte Sent /sec | | | | |
| | | | Packets Received /sec | | | | |
| | | | : | | | | |
| | | 2 | Bytes Received /sec | | | | |
| | | | Byte Sent /sec | | | | |
| | | | Packets Received /sec | | | | |
| | | | : | | | | |
| : | : | : | : | | | | |

Fig. 27

| Virtual Port ID | Items | Term | | | |
|---|---|---|---|---|---|
| | | 2009/5/2 6:45 | 2009/5/2 6:50 | 2009/5/2 6:55 | ... |
| 0 | Bytes Received /sec | | | | |
| | Byte Sent /sec | | | | |
| | Packets Received /sec | | | | |
| | : | | | | |
| 1 | Bytes Received /sec | | | | |
| | Byte Sent /sec | | | | |
| | Packets Received /sec | | | | |
| | : | | | | |
| 2 | Bytes Received /sec | | | | |
| | Byte Sent /sec | | | | |
| | Packets Received /sec | | | | |
| | : | | | | |
| 3 | Bytes Received /sec | | | | |
| | Byte Sent /sec | | | | |
| | Packets Received /sec | | | | |
| | : | | | | |
| : | : | | | | |

Fig. 30

METHODS AND APPARATUS FOR MANAGING VIRTUAL PORTS AND LOGICAL UNITS ON STORAGE SYSTEMS

CROSS-REFERENCE TO RELATED APPLICATION(s)

This is a continuation of U.S. patent application Ser. No. 12/569,453, filed Sep. 29, 2009, now U.S. Pat. No. 8,260,986, the entire disclosure of which is incorporated herein by reference.

BACKGROUND OF THE INVENTION

This invention is related to method and apparatus to manage virtual ports, logical units and statistics information regarding the virtual ports on storage systems.

SAN switches implement zoning among plurality of ports and make one or more exclusive portions of network by referring name service (i.e. name list) held in the switch. World Wide Port Name (WWPN), an unique identifier assigned to a port in a Fibre Channel (FC) Fabric, could be used for zone control. Fibre Channel is one type of protocol/specification for storage area network (SAN) that is network to connect servers (i.e. host computers) and storage systems. Recent development of the N_Port ID Virtualization (NPIV) technique allows multiple N_Port IDs to share a single physical N_Port in a FC or Fibre Channel over Ethernet (FCoE) facility. This allows transferability of virtual ports as described in US 2009/0025007A1.

In order to manage a plurality of virtual ports in information systems, relationships between the physical ports logical units on the storage systems needs to be managed and maintained by the storage system.

SUMMARY OF THE PRESENT INVENTION

Exemplary embodiments of the invention provide a system where a plurality of physical ports are allocated to one virtual port. This allows the host to access logical volumes allocated to different physical ports selectively via a common virtual port. Also, when many-to-many relationship between physical ports and virtual ports is generated, statistics information regarding the network and ports also should be monitored, maintained and analyzed in perspective of each virtual port.

In one embodiment, a storage system includes a first and second physical port to receive I/O operations from a host computer, a first and second logical volume coupled to the first physical port, and a storage controller including a memory and a processor, where the host computer is able to access both first and second physical port via a first virtual port, in response to a write command to be written to the first logical volume from the host computer, the storage controller controls data to be transferred to the first logical volume via the first physical port based on relations between a first virtual port identifier and the first volume number, and in response to a write command to be written to the second logical volume from the host computer, the storage controller controls data to be transferred to the second logical volume via the second physical port based on relations between a first virtual port identifier and the second volume number.

BRIEF DESCRIPTION OF THE DRAWING

FIG. 11 shows a first example of virtual port information 202(a) after relocation of virtual ports.

FIG. 12 shows a first example of virtual port information 202(b) after relocation of virtual ports.

FIG. 13 shows a second example of virtual port information 202(a) after relocation of virtual ports.

FIG. 14 shows a second example of virtual port information 202(b) after relocation of virtual ports.

FIG. 15 shows a third example of virtual port information 202(a) after relocation of virtual ports.

FIG. 16 shows a third example of virtual port information 202(b) after relocation of virtual ports.

FIG. 19 shows a first example of virtual port information 202(a) after deletion of virtual ports.

FIG. 20 shows a first example of virtual port information 202(b) after deletion of virtual ports.

FIG. 21 shows a second example of virtual port information 202(a) after deletion of virtual ports.

FIG. 22 shows a second example of virtual port information 202(b) after deletion of virtual ports.

FIG. 23 shows physical port statistics 204 in the memory 200.

FIG. 26 shows virtual port statistics information 205 in the memory 200.

FIG. 27 shows physical port statistics 544 in the memory 530.

FIG. 30 shows virtual port statistics 205 in the memory 530.

DETAILED DESCRIPTION OF A PREFERRED EMBODIMENT OF THE PRESENT INVENTION

A. System Configuration

Figure 1:
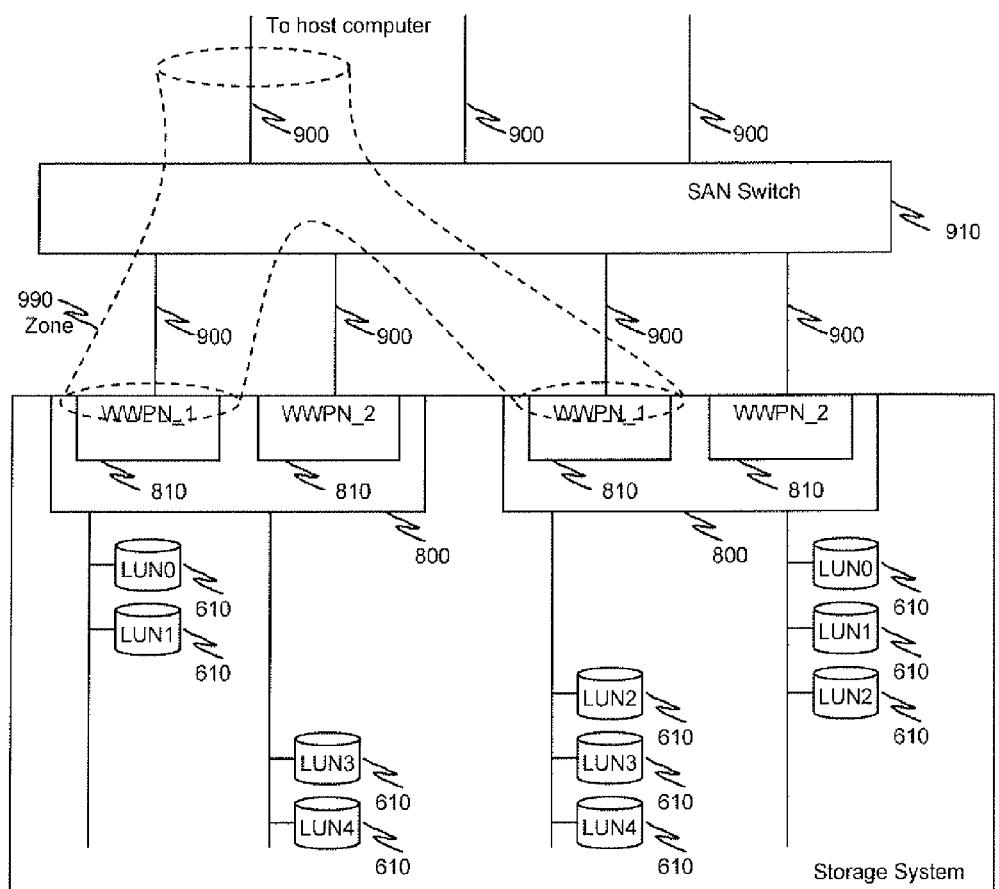
FIG. 1 illustrates an example of overview of a configuration of the invention.

FIG. 1 illustrates overview of an application of port virtualization on storage system 100 described in this embodiment. A storage system 100 includes a plurality logical volumes LUN 610 and physical ports 800. The storage system 100 is connected for communications with one or more host computers via network.

In this embodiment, each physical port 800 possesses a plurality of virtual ports 810 having WWPN which may be assigned by the user, and virtual ports 810 of the same WWPN (i.e. logically one virtual port 810) are placed on different physical ports 800. Virtual ports 810 in the SAN are identified by WWPN according to the specification of FC and SAN switch 910, which possesses zoning capability. SAN switch 910 can make one or more exclusive portions of network (i.e. zone 990) and they are realized by referring name service (i.e. name list) held in the SAN switch 900. Each of the virtual ports stores World Wide Name (WWN) identification data that is unique worldwide, (1) port WWN and (2) node WWN, respectively, each having an eight-byte size. Since these virtual identifier values are unique worldwide, they are capable of primarily identifying the ports and nodes in a FC network. Even though the virtual port 810 is located on multiple physical ports 800 it does not affect configuration and settings regarding SAN and SAN switch 910 such as the configuration of zoning. Thus, quantity of work for system replacement or data migration can be reduced with using this method.

Figure 2:
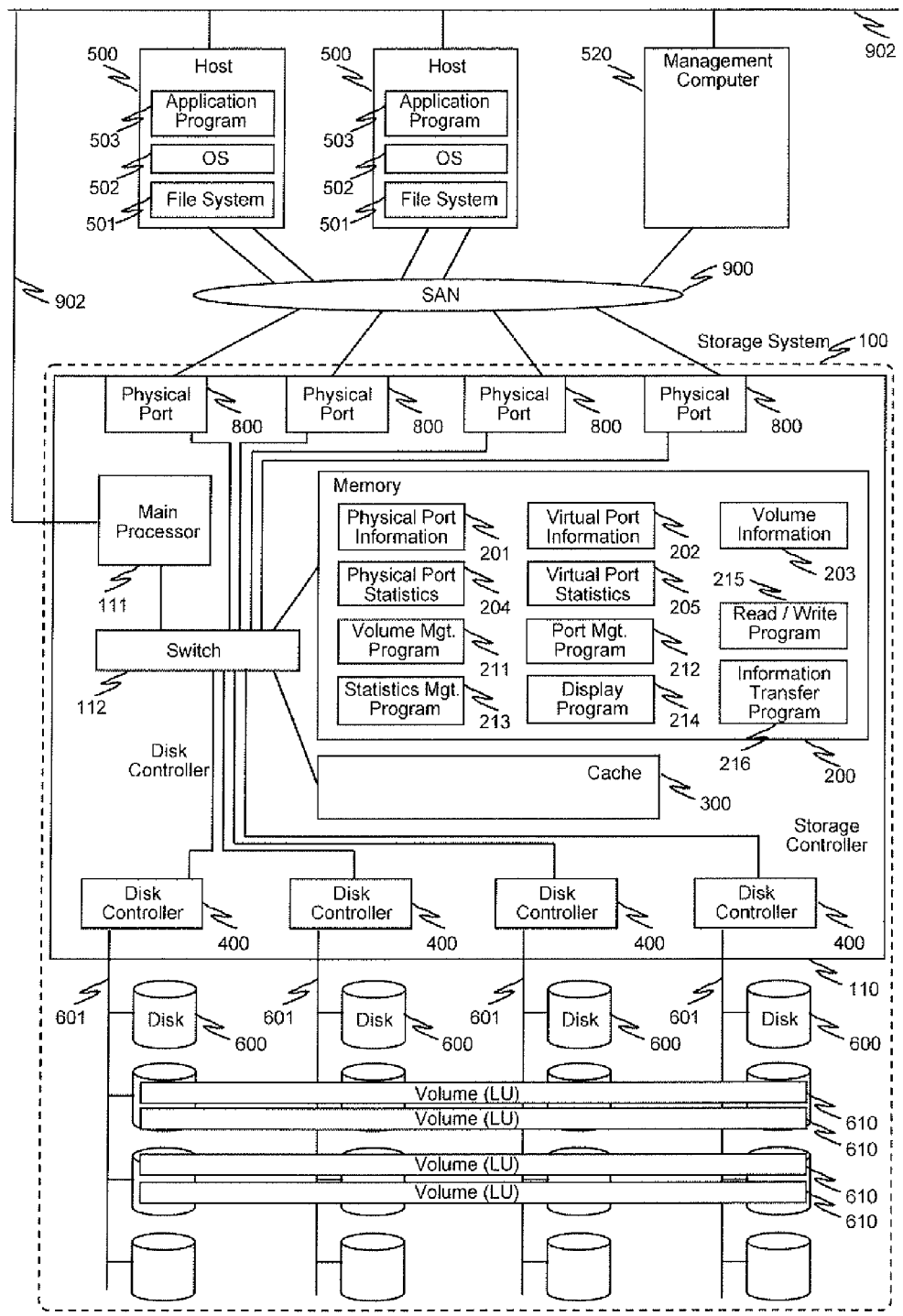
FIG. 2 illustrates an example of a hardware configuration in which the method and apparatus of the invention may be applied.

FIG. 2 describes an example of a hardware configuration in which the method and apparatus of the invention may be applied. The storage system 100 includes a storage controller 110 (having a main processor 111, a switch 112, a plurality of physical ports 800, a memory 200, a cache 300, and at least one disk controller 400), at least one storage device (e.g., Hard Disk Drive (HDD), Solid State Device) 600, and at least one backend path 601 (e.g., Fibre Channel, SATA, SAS, or iSCSI(IP)). The main processor 111 performs various processes for the storage controller 110. The main processor 111 and other components use various information stored in the memory 200, including physical port information 201, virtual port information 202, volume information 203, physical port statistics 204, virtual port statistics 205. The main processor 111 performs the processes by executing various programs stored in the memory 200, including a volume management program 211, a port management program 212, a statistics management program 213, a display program 214, a write/read operation program 215, and a information transfer program 216. Storage controller also includes an interface, such as API (Application Programming Interface), to send the statistics information obtained by the statistics management program 213 to the management computer 520. This communication is controlled by the information transfer program 216.

The host 500 and management computer 520 are connected to the physical ports 800 via the SAN 900 (e.g., Fibre Channel (FC), Fibre Channel over Ethernet (FCoE)). The host 500, management computer 520, and storage controller 110 are connected to each other via the LAN 902 (e.g., IP network). The host 500 has a file system 501, an operating system (OS) 502, and an application program 503. To execute these programs, the host 500 also has resources such as processor, memory, and storage devices not shown in FIG. 2 but known in the art.

Volumes (Logical Units or LUs) 610 provided by the storage system 100 to the host computers 500 are produced from collected areas of storage devices. The data stored may be protected by using parity code (i.e., by RAID configuration) or mirroring.

Figures 3, 4:
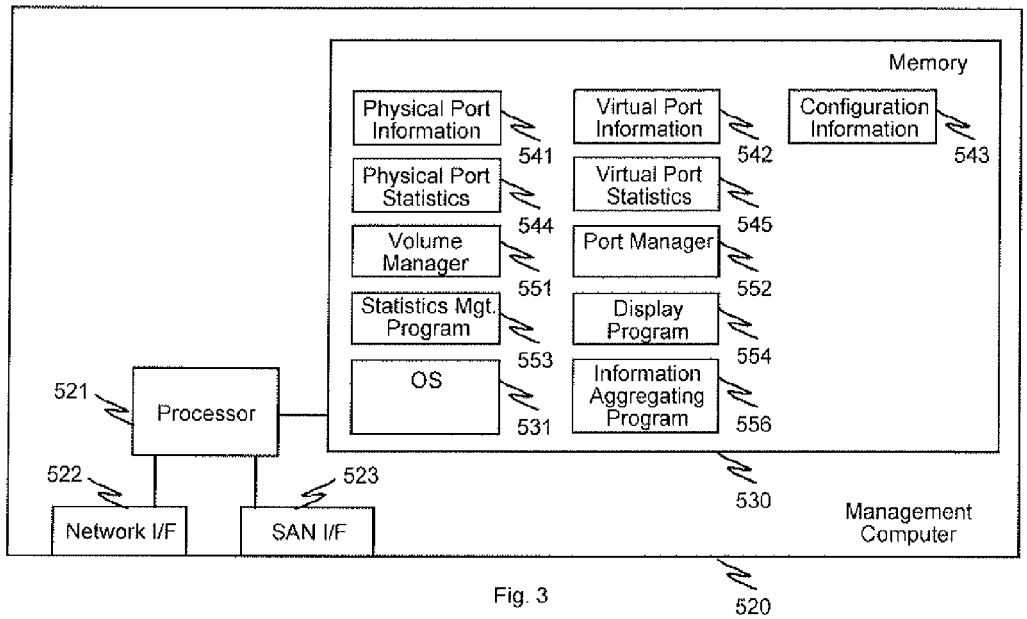
FIG. 3 illustrates an example of a hardware configuration of the management computer 520.
FIG. 4 illustrates an example of physical port information 201 in the memory 200.

FIG. 3 describes an example of a hardware configuration of the management computer 520. The management computer includes a processor 521, a network interface 522, SAN interface 523, and memory 530. The processor 521 and other components use various information stored in the memory 543, including physical port information 541, virtual port information 542, configuration information 543, physical port statistics 544, and virtual port statistics 545. The processor 521 performs the processes by executing various programs stored in the memory 530, including an OS 531, a volume manager 551, a port manager 552, a statistics management program 553, a display program 554, and an information aggregating program 556.

B. Creation of Physical Port Information

FIG. 4 shows an example of physical port information 201 in the memory 200. Physical port information maintains ID and WWPN for each physical port. This ID is internal ID that is unique in the storage system 100. This information is generated or updated on each configuration change regarding physical ports 800 in the storage system 100 according to the configuration. In other words, this information reflects the configuration at that time.

C. Volume Creation Process

Figures 5, 6:
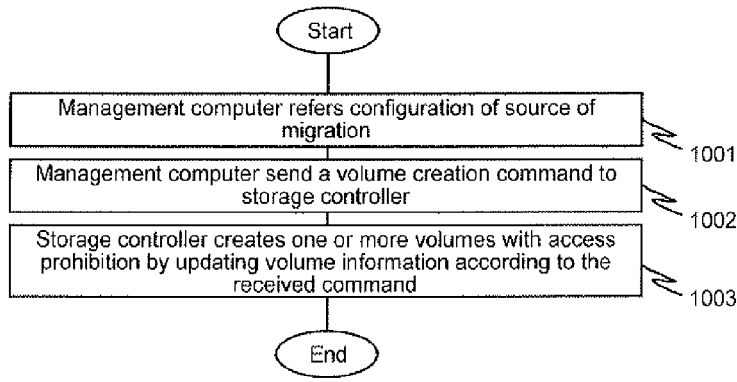
FIG. 5 is a flow diagram illustrating an overview of a process for creating volumes 610.
FIG. 6 shows an example of volume information 203 in the memory 200.

FIG. 5 illustrates a flow diagram for creating volumes 610 in the storage system 100. At step 1001, management computer 520 refers to the configuration of source of migration in the storage system 100. Volume information 203 in the memory is referred. For example, when volumes are created for data migration or system replacement between storage systems 100, this step may required. But, this step may be skipped if volume to be created is not used as a target volume for data migrations.

At step 1002, the management computer 520 generates and sends a volume creation command to storage controller 110. At step 1003, the storage controller 110 creates one or more volumes by updating volume information 203. During the updating process accesses to volumes from the host 500 are prohibited.

FIG. 6 shows an example of volume information 203 in the memory 200. This information includes volume ID, size, physical location (i.e. ID of disk 600 and start address), whether access is prohibited or not, whether the volume is assigned or not, port information, (i.e. whether it is associated by a virtual port or a physical port and port ID), and LUN (Logical Unit Number), for each volume. "Access prohibition" flag shows whether access from host computers 500 to the volume is prohibited or not. If the volume is not assigned to any port, "Assigned" flag is set to "No". Otherwise, "Assigned" flag is set to "Yes". In this case, type and ID of the port, LUN are recorded. LUN is the identifier used by the host computer to access the volume, so only assigned volumes would have this information.

D. Virtual Port Creation Process

Figures 7, 8:
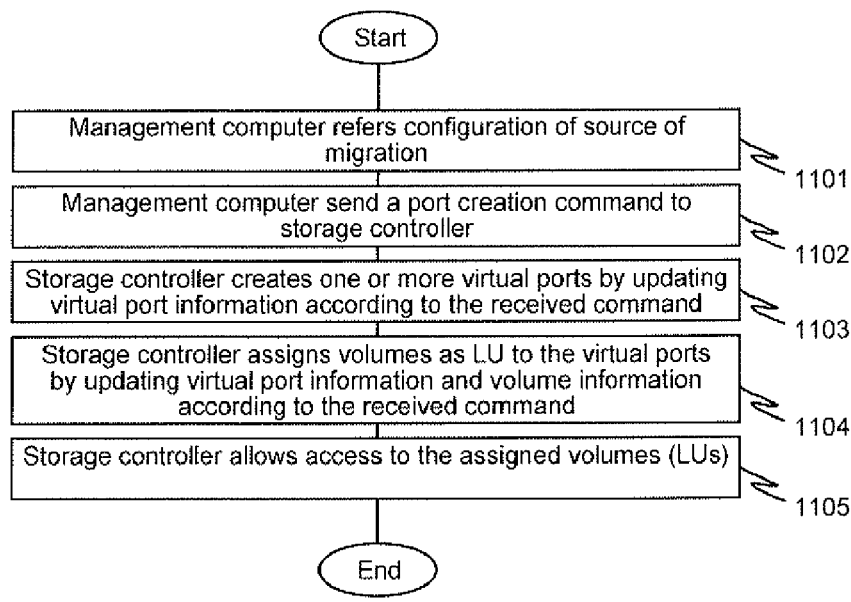
FIG. 7 is a flow diagram illustrating an overview of a process for creating a virtual port.
FIG. 8 shows a first example of virtual port information 202 in the memory 200.

FIG. 7 illustrates a flow diagram for creating a virtual port. At step 1101, management computer 520 refers to the configuration of source of migration in the storage system 100. When virtual ports 810 are created for data migration or system replacement between storage systems 100, management computer 520 may refer the configuration of the storage system 100. But, step 1101 may be skipped when there is no need to refer to source.

Figures 9, 10:
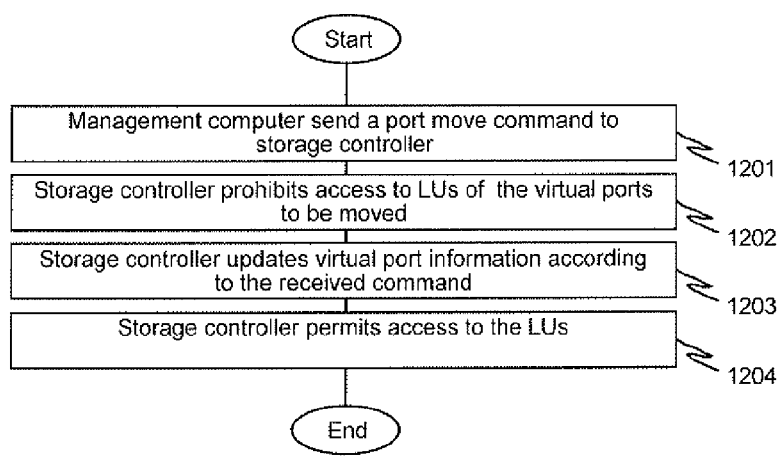
FIG. 9 shows a second example of virtual port information 202 in the memory 200.
FIG. 10 is a flow diagram illustrating an overview of a process for moving virtual ports.

At step 1102, the management computer 520 generates and sends a port creation command to the storage controller 110. WWPN of the virtual port 810 to be created, volume and LUN to be assigned as LU 610 to the virtual port 810 and physical port 800 where the virtual port 810 is located on, may be specified by the management computer 520 in the port creation command as parameters. At step 1103, the storage controller 110 creates one or more virtual ports by updating virtual port information 202 in response to receiving the port creation command FIG. 8 shows one example of virtual port information 202 stored in the memory 200. The virtual port information 202(*a*) includes ID of virtual port, ID of physical port associated with a virtual port, WWPN of the virtual port, the number and LUN of LUs assigned to the virtual port. FIG. 9 shows another example of the virtual port information 202 stored in the memory 200. While the virtual port information 202(*a*) is aggregated for each physical ports, in this example 202(*b*) the information is aggregated for each virtual port. Thus, the number of physical ports for each virtual port would be included in this example 202(*b*). Virtual port information 202(*b*) is preferred when the number of virtual ports assigned to each physical port increases in terms of table management. By using the information shown in FIGS. 8 and 9, the storage controller 110 can manage many-to-many relationship between physical ports 800 and virtual ports 810. At step 1104, the storage controller 110 assigns one or more volumes as LUs 610 to the virtual port 810 by updating virtual port information 202 and volume information 203 according to the information included in the port creation command. Thus, the relation between the virtual port 810 and the LUs 610 is set within the storage system 100. At step 1105, the storage controller 110 allows access to the assigned LUs 610 from host computer 500.

E. Virtual Port Move Process

FIG. 10 illustrates a flow diagram for moving virtual ports. At step 1201, management computer 520 generates and sends a port move command to the storage controller 110. WWPN or ID of the virtual port 810 and one or more LUs 610 subject to transfer, current physical port 800 and destination physical port 800, may be specified by the management computer in the command as parameters. At step 1202, the storage controller 110 prohibits access to LUs 610 associated with the virtual port 810 subject to transfer. At step 1203, the storage controller 110 changes the corresponding physical port ID for the specified virtual port 810 by updating the virtual port information 202. At step 1204, the storage controller 110 allows access to LUs from host computers 500.

Several patterns of migration of virtual port 810 and LUs 610 can be achieved by executing the above process as described below. FIG. 11 and FIG. 12 show a first example of updated virtual port information 202 as a result of a location change of virtual port 810. From the state shown by FIG. 8 and FIG. 9, virtual port 810 (ID 3) is transferred from a physical port 800 (ID 0) to a physical port 800 (ID 1). All LU 610 associated with the virtual port 810 (ID3) has been moved to the target physical port to maintain the relation with the virtual port 810 (ID3). Thus, the LU 610 is accessible from physical port 800 (ID 1) after the migration as illustrated in FIG. 11 and FIG. 12).

FIG. 13 and FIG. 14 show a second example of updated virtual port information 202 as a result of another migration from the state shown by FIG. 8 and FIG. 9. In the second example, virtual port 810 (ID 0) is moved from a physical port 800 (ID 0) to a physical port 800 (ID 1) and merged with existing virtual port 810 (ID 0) on the physical port 800 (ID 0). All LU 610 associated with the virtual port 810 also changes the associated physical port to physical port 800 (ID 0). Thus, as shown in FIG. 13, the entry for virtual port 810 (ID 0) for physical port 800 (ID 0) is deleted. The entry for virtual port 810 (ID 0) for physical port 800 (ID 1) is updated by increasing the number of LU to 5 and adding the LUN 0,1, which was associated to virtual port 810 (ID 0) for physical port 800 (ID 0) in FIG. 8. Accordingly in FIG. 14, the number of LU is increased to 5 and reflects the added LUN 0,1, which was associated to virtual port 810 (ID 0) for physical port 800 (ID 0) in FIG. 9.

FIG. 15 and FIG. 16 show a third example of updated virtual port information 202 as a result of another migration from the state shown by FIG. 8 and FIG. 9. In this case management computer 520 specifies two LUs 610 on virtual port 810 (ID 2) for transfer so that the LUs 610 (LUN 2 and LUN 3) is moved from a physical port 800 (ID 0) to physical port 800 (ID 1). Other LUs 610 (LUN 0 and LUN 1) on the virtual port 810 (ID 2) are left on the physical port 800 (ID 0), thus creating a split of physical ports associated with a single virtual port.

As explained above, these kinds of migration regarding virtual ports 800 can be achieved by a single type of command by changing parameters in the command from the management computer 520 to the storage controller 110. However, the above operations such as move, merge and division may be realized by commands for each operation such as a move command, a merge command and a division command

F. Virtual Port Deletion Process

Figures 17, 18:
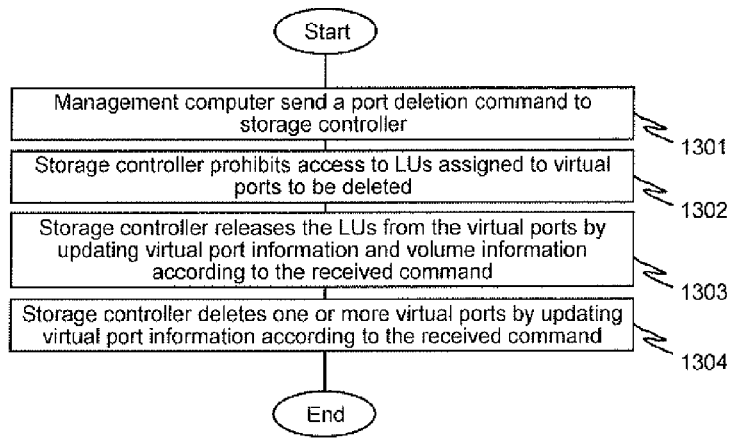
FIG. 17 is a flow diagram illustrating an overview of a process for deleting virtual ports.
FIG. 18 shows a first example of volume information 203 after deletion of virtual ports.

FIG. 17 illustrates a flow diagram for deleting virtual ports. At step 1301, management computer 520 generates and sends a port deletion command to storage controller 110. WWPN or ID of the virtual port 810 subject to deletion, the physical port 800 associated with the virtual port 810, and/or deletion manner described below, may be specified in the command as parameters. At step 1302, the storage controller 110 prohibits access to LUs 610 associated with the virtual port 810 subject to deletion. At step 1303, the storage controller 110 releases the LUs from the virtual port 810 by updating the virtual port information 202 and volume information 203. At step 1304, the storage controller 110 deletes one or more virtual ports 810 by updating virtual port information 202 according to the received command FIG. 18, FIG. 19 and FIG. 20 show a first example of updated volume information 203 and virtual port information 202(*a*) (b) as a result of deletion of virtual port 810 (ID 0). In this example, virtual port 810 (ID 0) on physical port 800 (ID 0) is deleted from the state shown by FIG. 6, FIG. 8 and FIG. 9 according to the command FIG. 18 shows that the port is no longer assigned for volume (ID 0) and that physical/virtual port, port ID, LUN information for that volume is deleted compared to FIG. 6. FIG. 19 shows that the entry for virtual port 810(ID 0) associated with physical port 800 (ID 0) is deleted compared to FIG. 8. FIG. 20 shows that the entry for physical port 800 (ID 0) associated with virtual port 810(ID 0) is deleted compared to FIG. 9.

The second example illustrated in FIG. 21 and FIG. 22 is a case, where the specified virtual port 810 can be deleted from all the associated physical ports 800 from the state shown by FIG. 8 and FIG. 9. In this example, the virtual port 810 (ID 0) is deleted from all physical port 800. Virtual port information 202(*a*) shown in FIG. 21 describes that entry for virtual port 810 (ID 0) is deleted compared to FIG. 8. Virtual port information 202(*a*) shown in FIG. 22 deletes the entry for virtual port 810 (ID 0) compared to FIG. 9.

The first and second example for deletion of virtual ports 800 can be achieved by a single type of command by changing parameters in the command. However, the above operations may be realized by commands for each operation.

In the previous description, the commands for port creation, move and deletion were all sent from management computer 520. However, the instructions may be come from management console of storage system 100 as well.

G. Statistics Monitoring/Calculation Process

During execution of operations using physical ports 800, such as data read process and write process, the storage controller 110 monitors and records a variety of values regarding the processes and performance for each virtual port 810 on each physical port 800 in addition to ordinary monitored values regarding physical ports 800. Thus, in the process, several metrics are monitored/counted and classified for each virtual port 810. Statistics information regarding the network and ports is monitored, maintained and analyzed in perspective of each virtual port to improve performance and achieve load balancing. FIG. 23 shows an example of physical port statistics information 204 in the memory 200 that maintains monitored values. In FIG. 23, the physical port statistics information 204 includes physical port ID, virtual port ID, and values such as bytes received per second, bytes sent per second, the number of packets sent per second, the number of packets received per second, the number of inbound packets of error per second, the number of outbound packets of error per second, queue length regarding packets and values regarding quality of service. These values can be stored in terms of maximum values, minimum values and/or average values for each periodical period. The periodical periods may be set by the management computer 520. The storage controller 110 maintains the values aggregated/calculated for each virtual port 810 by aggregating the monitored value of each physical port 800 for each WWPN.

Figure 24:
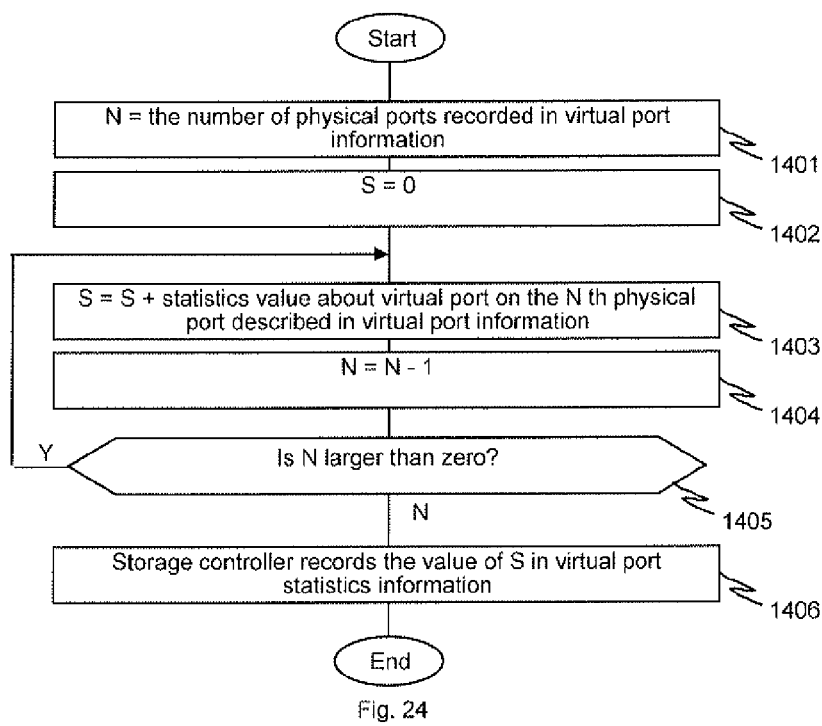
FIG. 24 is a flow diagram illustrating an overview of a process for calculating statistics of the virtual ports.
Figure 25:
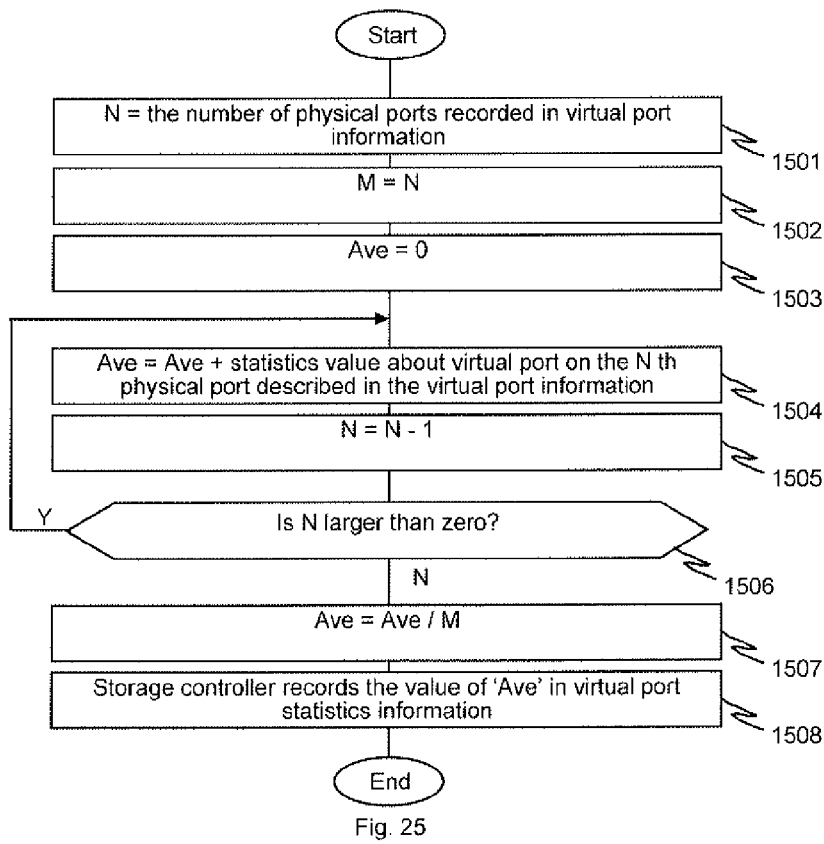
FIG. 25 is a flow diagram illustrating an overview of a process for calculating statistics of the virtual ports.

FIG. 24 and FIG. 25 illustrates a flow diagram for calculating statistics of the virtual ports. FIG. 24 shows the process to calculate the total values for each virtual port. Values calculated include bytes received and sent. At step 1401, the storage controller 110 sets valuable N to the number of physical ports 800 recorded in virtual port information 202 for the virtual port 810 that requires statistics. At step 1402, the storage controller 110 initializes valuable S to zero (0). At step 1403, the storage controller 110 updates the valuable S with the sum of S and the statistical value for virtual port 800 on the Nth physical port 800 described in virtual port information 202. At step 1404, the storage controller 110 decrements by one the valuable N. At step 1405, the storage controller 110 checks the value of the valuable N. If the value is larger than zero, the process proceeds to step 1403. Otherwise, the process proceeds to step 1406. At step 1406, the storage controller 110 records the value of the valuable S in virtual port statistics information 205. The aggregated values are calculated based on the monitors results of each physical and virtual ports, where virtual ports are identified using the WWPN.

FIG. 25 shows a process for calculating the average value, such as queue length or response time. At step 1501, the storage controller 110 sets valuable N to the number of physical ports 800 recorded in virtual port information 202 for the virtual port 810 that requires statistics. At step 1502, the storage controller 110 sets valuable M to the value of the valuable N. At step 1503, the storage controller 110 initializes a valuable Ave to zero (0). At step 1504, the storage controller 110 updates the valuable Ave with the sum of Ave and the statistical value for virtual port 800 on the Nth physical port 800 described in virtual port information 202. At step 1505, the storage controller 110 decrements by one the valuable N. At step 1506, the storage controller 110 checks the value of the valuable N. If the value is larger than zero, the process proceeds to step 1504. Otherwise, the process proceeds to step 1507. At step 1507, the storage controller 110 divides the valuable Ave by the valuable M. At step 1508, the storage controller 110 records the value of the valuable Ave in virtual port statistics information 205. The values are calculated based on the monitors results of each physical and virtual ports, where virtual ports are identified using the WWPN.

FIG. 26 shows an example of virtual port statistics information 205. This information includes the same items/metrics as physical port statistics information 204 and maintains values aggregated/calculated by the way mentioned above.

With the processes described above, management of many-to-many relationship between physical ports 800 and virtual ports 810 generated by using NPIV technique applied to the storage controller 110 is achieved. And, monitoring and management of statistics information from a perspective of each virtual port 810 is realized. The information such as port configuration and statistics also can be displayed to users by management console (not shown in FIG. 3) of storage controller 110.

H. Statistics Monitoring/Calculation Process by Management Computer

Figure 28:
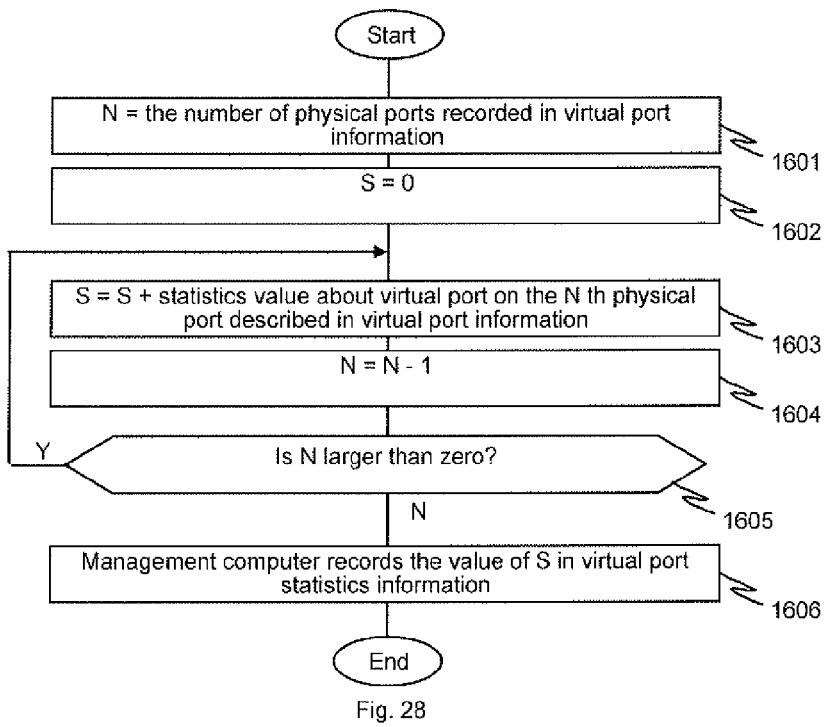
FIG. 28 is a flow diagram illustrating an overview of a process for calculating statistics of the virtual ports.
Figure 29:
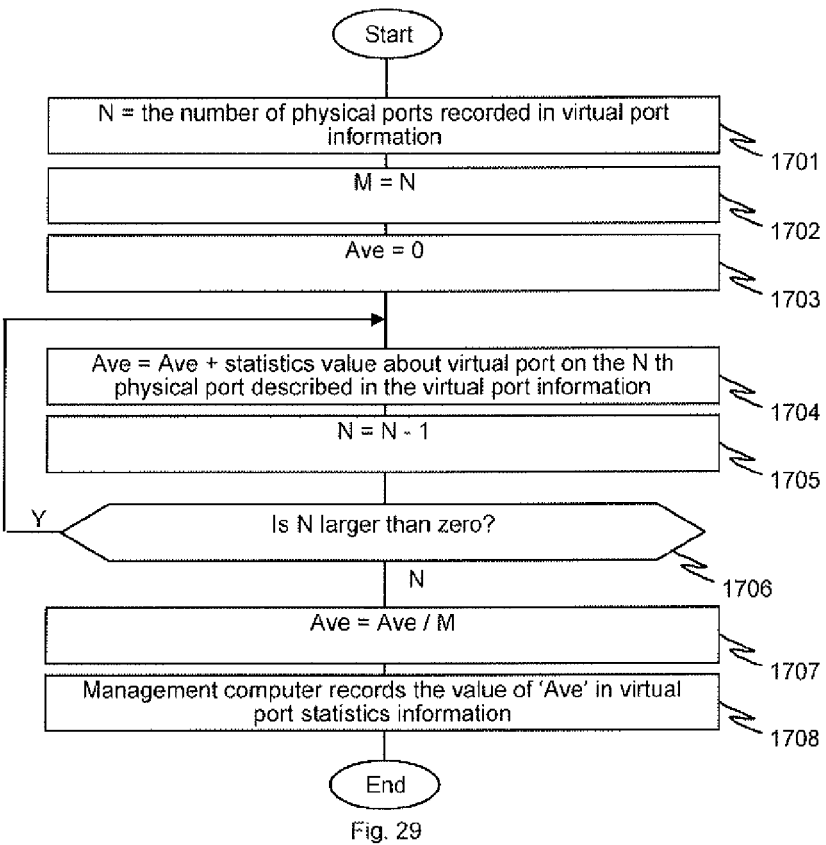
FIG. 29 is a flow diagram illustrating an overview of a process for calculating statistics of the virtual ports.

In addition to management of statistics information for each virtual port 810 by storage controller 110, management computer 520 can obtain the statistics information from the storage controller 110 via LAN 902 and/or SAN 900, and manage the statistics information each virtual port 810. FIG. 27 illustrates physical port statistics information 544 stored in the memory 530 of the management computer 520. Physical port statistics information 544 includes storage system ID, physical port ID, virtual port ID, and values such as bytes received per second, bytes sent per second, the number of packets sent per second, the number of packets received per second, the number of inbound packets of error per second, the number of outbound packets of error per second, queue length regarding packets and values regarding quality of service. Since management computer is capable of managing multiple storage systems 100, storage system ID would be required in addition to contents of physical port statistics information 204 for each storage controller 110. FIG. 28 and FIG. 29 show examples of statistics calculation process executed by management computer 520. These processes are similar to the processes shown in FIG. 24 and FIG. 25. By these processes, management computer 520 also maintains virtual port statistics information 545 that has the same items as virtual port statistics information 205 of each storage controller 110. FIG. 30 shows an example of virtual port statistics information 545.

Management computer 520 also possesses physical port information 541, virtual port information 542 and configuration information 543 by referring (obtaining) physical port information 201, virtual port information 202 and volume information 203 of each storage system 100 via LAN 902 and/or SAN 900. These information include configuration information of elements (e.g. physical ports 800, virtual ports 810 and LUs (volumes) 610) of one or more storage systems 100. While the calculated results could be send from each storage controller 110 to the management computer 530, aggregating the information by the management computer instead could decrease the load for the storage controllers 110. This is especially efficient when the number of ports increase.

The present invention provides a storage system which virtual ports can be accessed from host computers via SAN and multiple virtual ports can be placed on one physical port on the storage system while one virtual port can be located on multiple physical ports. In response to commands from computers, the storage system manages relation between physical ports and virtual ports and relation between virtual port and volumes by performing processes such as creating a virtual port, assigning LUs to a virtual port, moving a virtual port between physical ports and deleting a virtual port. The storage system also maintains/calculates statistics information regarding ports and shows it from a perspective for each virtual port. Moreover, the management computer aggregates the management information and the statistics information from storage systems and shows it for each virtual port. Having described my invention, however, many modifications thereto will become apparent to those skilled in the art to which it pertains without deviation from the spirit of the invention as defined by the scope of the appended claims.

The invention claimed is:

1. A system comprising:
a host computer; and
a storage system including:
a first and second physical port to receive I/O operations from the host computer;
a first plurality of logical volumes coupled to the first physical port;
a second plurality of logical volumes coupled to the second physical port; and
a storage controller including a memory and a processor,
wherein the host computer is able to access both the first and second physical port via a first virtual port,
wherein in response to a write command to be written to a first logical volume in the first plurality of logical volumes from the host computer, the storage controller controls data to be transferred to the first logical volume via the first physical port which is identified based on a first virtual port identifier and a first volume number, and
wherein in response to a write command to be written to a second logical volume in the second plurality of logical volumes from the host computer, the storage controller controls data to be transferred to the second logical volume via the second physical port which is identified based on a first virtual port identifier and a second volume number,
wherein in response to a virtual port delete command identifying the first logical volume, the storage controller:
acquires information of the first virtual port identifier and the first physical port identifier associated with the first logical volume, and
deletes Information indicating a relationship between the first virtual port identifier and the first physical port identifier based on the information acquired by the storage controller.

2. The system according to claim 1,
wherein the first virtual port identifier is WWPN, and first and second volume numbers are logical volume numbers.

3. The system according to claim 1,
wherein the memory stores the relationship between the logical volumes, the virtual port identifiers, and the physical ports.

4. The system according to claim 1,
wherein the storage controller obtains statistics of the first virtual port.

5. The system according to claim 1, further comprising:
a management server coupled to the storage system, which receives statistics of physical ports from the storage system, and presents statistics of the first virtual port calculated based on the statistics of physical ports to a user.

6. The system according to claim 4,
wherein the statistics of the first virtual port includes bytes received and sent or response time.

7. The system according to claim 2,
in response to a volume creation request the storage controller prohibits access to volumes from the host computer, assigns a volume to either a virtual port or a physical port, and updates volume information in connection with the assigned ports.

8. A storage system comprising:
a first and second physical port to receive I/O operations;
a first plurality of logical volumes coupled to the first physical port;
a second plurality of logical volumes coupled to the second physical port; and
a storage controller including a memory and a processor,
wherein the storage controller controls to I/O operations aimed through a first virtual port via either the first physical port or the second physical port,
wherein in response to a write command to be written to a first logical volume in the first plurality of logical volumes, the storage controller controls data to be transferred to the first logical volume via the first physical port which is identified based on a first virtual port identifier and a first volume number, and
wherein in response to a write command to be written to a second logical volume in the plurality of second logical volumes, the storage controller controls data to be transferred to the second logical volume via the second physical port which is identified based on the first virtual port identifier and a second volume number,
wherein in response to a virtual port delete command identifying the first logical volume, the storage controller:
acquires information of the first virtual port identifier and the first physical port identifier associated with the first logical volume, and
deletes information indicating a relationship between the first virtual port identifier and the first physical port identifier based on the information acquired by the storage controller.

9. The storage system according to claim 8,
wherein the information includes correspondence between the first virtual port identifier allocated to the first virtual port, and a plurality of physical port identifiers allocated to the first and the second physical port, and the first virtual port identifier is WWPN.

10. The storage system according to claim 9,
wherein the information further includes correspondence between a second virtual port identifier allocated to a second virtual port, and the plurality of physical port identifiers, and
wherein the storage controller controls to I/O operations aimed through the second virtual port via either the first physical port or the second physical port selectively based on the information.

11. The storage system according to claim 8,
wherein the information includes statistics on the first and the second physical ports, and the first and the second virtual ports, and
wherein each of the first and the second physical ports are monitored, and the statistics of each of the first and the second virtual ports are calculated based on the monitored statistics of the first and the second physical ports included in each of the first and the second virtual ports.

12. The storage system according to claim 11,
wherein the information further includes statistics that includes bytes received and sent and response time, and
wherein the calculation is performed by the processor using the information of correspondence between the first and the second virtual port identifiers, and the first and the second physical port identifiers.

13. The system including the storage system of claim 8, further comprising:
a management computer coupled to the storage system via network and includes a processor,
wherein the information further includes statistics on the first and the second physical ports, and the first and the second virtual ports, and
wherein the management computer receives from the storage system the information of the monitored results for the first and the second physical ports, and the processor in the management computer processes calculation of the statistics of each of the first and the second virtual ports,
wherein each of the first and the second physical ports are monitored, and the statics of each of the first and the second virtual ports are calculated based on the monitored statistics of the first and the second physical ports included in each of the first and second virtual ports.

14. The storage system according to claim 8,
in response to a volume creation request the storage controller prohibits access to volumes from the host computer, assigns a volume to either a virtual port or a physical port, and updates volume information stored in the memory.

15. The storage system according to claim 8,
in response to a virtual port creation command the storage controller prohibits access to volumes from the host computer, assigns volumes to a third virtual port having a third virtual port identifier, updates the information of correspondence between the third virtual port identifier and the plurality of physical port identifiers stored in the memory, and releases the prohibited access.

16. The storage system according to claim 15,
wherein the some of the first plurality of logical volumes and some of the second plurality of logical volumes are assigned to the third virtual port established by the information in the memory using the third port identifier.

17. The storage system according to claim 8,
in response to a virtual port move command against the first virtual port from the first physical port to second physical port, the storage controller prohibits access to volumes coupled with the first virtual port from the host computer, updates the information of correspondence between the first virtual port identifier and the first physical port identifier to between the first virtual port identifier and the second physical port identifier, and releases the prohibited access.

18. The storage system according to claim 8,
in response to a virtual port delete command against the second virtual port, the storage controller prohibits access to volumes coupled with the second virtual port from the host computer, releases volumes assigned to the second virtual port using the information of correspondence.

\* \* \* \* \*